Patented June 13, 1933

1,913,382

UNITED STATES PATENT OFFICE

IVAN GUBELMANN, OF SOUTH MILWAUKEE, AND ARTHUR R. MURPHY, OF MILWAUKEE, WISCONSIN, ASSIGNORS, BY MESNE ASSIGNMENTS, TO E. I. DU PONT DE NEMOURS & COMPANY, A CORPORATION OF DELAWARE

TRISAZO DYESTUFFS AND PROCESS OF PREPARING THE SAME

No Drawing.    Application filed November 21, 1930.    Serial No. 497,328.

This invention relates to azo dyestuffs.

It is an object of this invention to produce azo dyestuffs producing on cotton blue, to bluish-gray to gray shades, of superior fastness to light and to washing and of good solubility.

We have found that dyestuffs satisfying these qualifications may be obtained by diazotizing an aryl-amine containing no hydroxyl groups and coupling the same to a dialkoxyaniline having the position para to the amino group free, rediazotizing and coupling to Cleve's acid or to another dialkoxyaniline molecule having a free para position, rediazotizing and finally coupling to an acidyl-2-amino-8-naphthol-6-sulfonic acid compound. If desired, the sequence of the second and third components may be interchanged.

Our novel dyestuffs have the general formula:

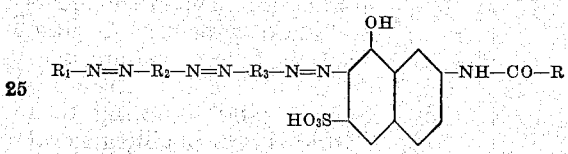

wherein $R_1$ is an aryl residue of the benzene or naphthalene series, preferably containing a sulfonic acid group, but containing no hydroxyl groups. $R_1$ may, however, contain other substituents such as alkyl, halogen, alkoxy groups and the like. At least one of the groups $R_2$ and $R_3$ is a dialkoxy-aniline residue having a free para position while the other one is a Cleve's acid residue or another dialkoxy-aniline residue of the type above defined; and wherein R stands for a hydrogen atom or an alkyl, aryl or aralkyl residue.

Our novel dyestuffs are characterized by being dark powders, soluble in water with a bluish-violet color and in sulfuric acid with greenish-blue color. They dye cotton directly in blue to bluish-gray to gray shades of excellent fastness to light. They also dye silk and regenerated cellulose fibers.

The following examples will serve further to illustrate our invention, but it should be understood that the same are merely illustrative, not limitative. The parts given are parts by weight.

Example 1

207.5 parts of p-chloro-aniline-m-sulfonic acid are diazotized in the usual manner and coupled to 153 parts of 2,5-dimethoxy-aniline in the presence of acid. After stirring 12 hours the precipitated coupling product is heated to 80° C. and filtered. The resulting product is formed into a paste in ice and water, 232 parts of 20° Bé. hydrochloric acid are added, and the product is next diazotized by the addition of 69 parts of sodium nitrite. When diazotization is complete, a cold aqueous solution of 223 parts of 1,6-Cleve's acid and 53 parts of sodium carbonate are added to the mass. The coupling is completed by neutralizing the mineral acid with sodium acetate. The resulting product is now converted into the sodium salt by the addition of sodium hydroxide and is next further diazotized by adding 69 parts of sodium nitrite and running the mixture into HCl sufficient to insure mineral acidity. This compound is next coupled to 281 parts of 2-acetylamino-8-naphthol-6-sulfonic acid in the presence of sodium carbonate. The completed coupling mass is heated to 70° C. salted out and filtered.

As the dry powder, it has a dark appearance with a bronzy luster. It is soluble in water with a bluish-violet color and in concentrated sulfuric acid gives a greenish-blue solution.

On reducing the dye with stannous chloride the following products are obtained, p-chloro-aniline-m-sulfonic acid, 2,5-dimethoxy-1,4-phenylene-diamine, 1,4-naphthylene-diamine-6-sulfonic acid, 2-acetyl-amino-7-amino-8-naphthol-6-sulfonic acid.

It dyes cotton in bluish gray shades with remarkable fastness to light and good fastness to washing. On mixed cotton and silk fibers dyed from a neutral Glauber's salt bath, it leaves the silk practically unchanged and the dyeings are discharged to a clear white with hydrosulfite. It will, however, dye silk from an acid bath and regenerated cellulose from a neutral Glauber's salt bath in bluish gray shades.

*Example 2*

303 parts of 2-naphthylamine-6, 8-disulfonic acid are used in place of p-chloro-aniline-m-sulfonic acid as used in Example 1 and all other conditions set out in the example are maintained. A dyestuff having similar properties of the product of Example 1 is obtained.

This dye yields upon reduction 2-naphthylamine-6-8-disulfonic acid, 2,5-dimethoxy-1,4-phenylene-diamine, 1,4-naphthylene-diamine-6-sulfonic acid and 2-acetylamino-7-amino-8-naphthol-6-sulfonic acid.

In an analogous manner a great number of other dyestuffs of similar general properties may be prepared by replacing the various components mentioned in Example 1 by their various equivalents as specified at the beginning of this specification. Thus, instead of starting with p-chloro-aniline-meta-sulfonic acid, we may use other halogen substituted aniline-sulfonic acids and these may be substituted in other positions; o- m- or p-aniline-sulfonic acid; the various toluidine sulfonic acids, anisidine sulfonic acids; the various alpha and beta-naphthylamine-mono- or poly-sulfonic acids; and the like. Instead of 2,5-dimethoxy-aniline, other dialkoxy anilines such as 2,5-diethoxy-aniline, 2,6-dimethoxy-aniline may be used provided the position para to the amino group is free.

Instead of coupling first to the dialkoxy-aniline and then to Cleve's acid, we may couple first to Cleve's acid and then re-diazotize and couple to the dialkoxy-aniline. We may also use the dialkoxy-aniline as both second and third component, provided the entire molecule contains a sufficient amount of $SO_3H$ groups to render the same water-soluble to a satisfactory degree. As Cleve's acid, we may use either the 1,6- or 1,7-naphthylamine sulfonic acid, or a mixture of the two. As an acidyl group in the end component we may use the formyl residue, acetyl residue, benzoyl residue or the like.

In the claims below it should be understood that where new products, dyestuffs, or articles of manufacture are claimed, we mean to include those bodies not only in substance, but also in whatever state they exist when applied to material dyed, printed, or pigmented therewith.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing azo dyestuffs which comprises diazotizing an aryl-amine of the benzene or naphthalene series having no phenolic groups, coupling to a component of the group consisting of dialkoxy-aniline having a free para position and Cleve's acid, rediazotizing, coupling to the second member of said group or again to dialkoxy-aniline, rediazotizing and coupling to an acidyl-2-amino-8-naphthol-6-sulfonic acid compound.

2. The process of preparing azo dyestuffs which comprises diazotizing an aryl-amine of the benzene or naphthalene series containing an $SO_3H$ group but free from hydroxyl groups, coupling to a dimethoxy-aniline having a free para position, rediazotizing, coupling to a Cleve's acid, rediazotizing and coupling to acetyl-2-amino-8-naphthol-6-sulfonic acid.

3. The process of preparing an azo dyestuff, which comprises diazotizing p-chloroaniline-meta-sulfonic acid, coupling to 2,5-dimethoxy-aniline, rediazotizing, coupling to Cleve's acid, rediazotizing and coupling to acetyl-2-amino-8-naphthol-6-sulfonic acid.

4. In the process of preparing an azo dyestuff, the step which comprises diazotizing a compound of the following probable general formula:

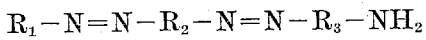

$$R_1-N=N-R_2-N=N-R_3-NH_2$$

in which $R_1$ is an aryl residue of the benzene or naphthalene series which contains no hydroxyl groups, and in which one of the members $R_2$ and $R_3$ is a dialkoxy-benzene residue while the other is a naphthalene sulfonic acid residue or in which both $R_2$ and $R_3$ are dialkoxy-benzene residues, and coupling to a compound of the following probable general formula:

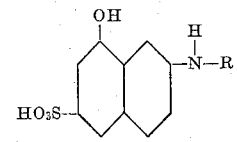

in which R is an acyl group.

5. In the process of preparing an azo dyestuff, the step which comprises diazotizing a compound of the following probable formula:

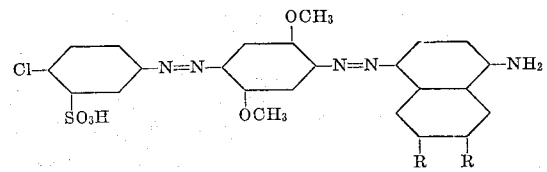

in which one R is an $SO_3H$ group while the other R is a hydrogen atom and coupling to acetyl-2-amino-8-naphthol-6-sulfonic acid.

6. As new products of manufacture, dyestuffs having the following general formula:

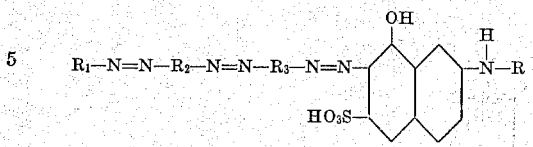

wherein $R_1$ is an aryl residue of the benzene or naphthalene series which contains no OH groups; wherein one of the members $R_2$ and $R_3$ is a dialkoxy-benzene residue while the other is a naphthalene sulfonic acid residue or wherein both $R_2$ and $R_3$ are dialkoxy-benzene residues; and wherein R stands for an acyl group; said dyestuffs being dark powders, soluble in water with a bluish-violet color, and in sulfuric acid with a greenish-blue color; and said dyestuffs dyeing cotton directly in blue to bluish gray to gray shades.

7. As new products of manufacture, dyestuffs having the following probable general formula:

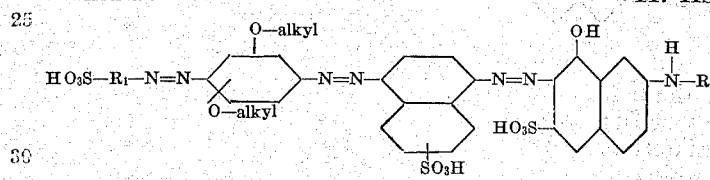

in which $R_1$ stands for a residue of the benzene or naphthalene series which contains no OH groups, and in which R stands for an acyl group.

8. As new products of manufacture, dyestuffs having the following general formula:

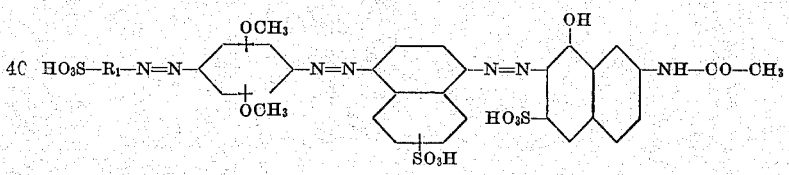

wherein $R_1$ stands for a residue of the benzene or naphthalene series which contains no OH groups.

9. As a new product of manufacture, a dyestuff having the following general formula:

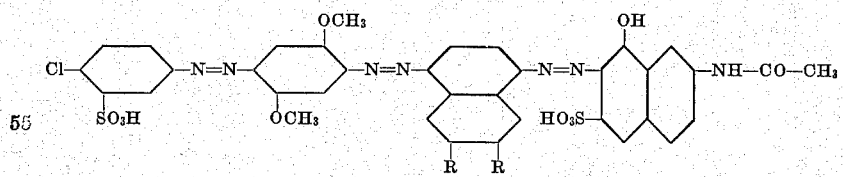

in which one R is an $SO_3H$ group while the other R is a hydrogen atom, said dyestuffs being dark powders soluble in water with a bluish-violet color and in sulfuric acid with a greenish-blue color, and said dyestuffs dyeing cotton directly in bluish-gray shades of good fastness to light.

10. In the process of preparing an azo dyestuff, the step which comprises diazotizing a compound of the following probable general formula:

$$R_1-N=N-R_2-N=N-R_3-NH_2$$

in which $R_1$ is an aryl residue of the benzene or naphthalene series which may be further substituted by alkyl, halogen, alkoxy or sulfonic acid groups but which contains no hydroxyl groups, and in which one of the members $R_2$ and $R_3$ is a dialkoxy benzene residue while the other is a naphthalene sulfonic acid residue or in which both $R_2$ and $R_3$ are dialkoxy-benzene residues, and coupling to a compound of the following probable general formula:

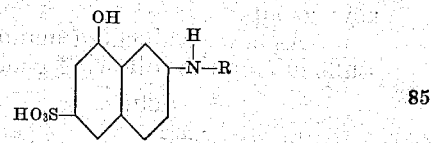

in which R is an acyl group.

11. As new products of manufacture dyestuffs having the following general formula:

wherein $R_1$ is an aryl residue of the benzene or naphthalene series which may be further substituted by alkyl, halogen, alkoxy or sulfonic acid groups, but which contains no OH group; wherein one of the members $R_2$ and $R_3$ is a dialkoxy-benzene residue while the other is a naphthalene sulfonic acid residue or wherein both $R_2$ and $R_3$ are dialkoxy-benzene residues; and wherein R stands for an acyl group; said dyestuffs being dark powders, soluble in water with a bluish-violet color, and in sulphuric acid with a greenish-blue color; and said dyestuffs dyeing cotton directly in blue to bluish-gray to gray shades.

12. As new products of manufacture, dyestuffs having the following probable general formula:

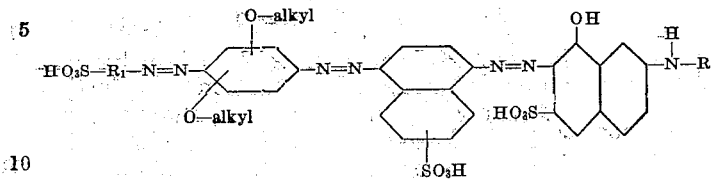

in which $R_1$ stands for a residue of the benzene or naphthalene series which may be further substituted by alkyl, halogen, alkoxy or sulfonic acid groups but which contains no OH groups, and in which R stands for an acyl group.

13. As new products of manufacture, dyestuffs having the following general formula:

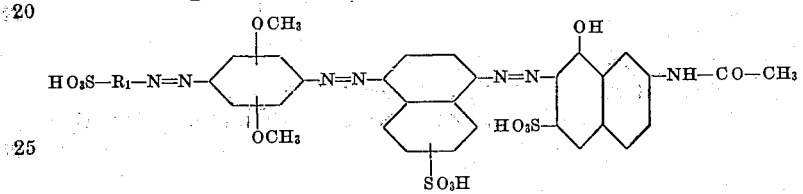

wherein $R_1$ stands for a residue of the benzene or naphthalene series which may be further substituted by alkyl, halogen, alkoxy or sulfonic acid groups but which contains no OH group.

In testimony whereof, we have hereunto subscribed our names at Carrollville, Milwaukee County, Wisconsin.

IVAN GUBELMANN.
ARTHUR R. MURPHY.